United States Patent [19]

Poisson

[11] Patent Number: 5,327,360
[45] Date of Patent: Jul. 5, 1994

[54] MEASURING RELATIVE DEFLECTION OF INTERSPACED TOOTHED WHEELS ON A LESS THAN ONCE PER REVOLUTION BASIS

[75] Inventor: Ronald D. Poisson, Springfield, Mass.

[73] Assignee: United Technologies Corporation, Hartford, Conn.

[21] Appl. No.: 949,946

[22] Filed: Sep. 24, 1992

[51] Int. Cl.$^5$ ................ G06F 15/20; G01P 3/489
[52] U.S. Cl. ................ 364/571.07; 364/565; 364/559; 364/571.01; 364/431.01
[58] Field of Search ............ 364/571.01–571.08, 364/559, 431.01, 424.01, 565; 324/207.12, 166, 160; 73/2; 416/34

[56] References Cited

U.S. PATENT DOCUMENTS

| | | | |
|---|---|---|---|
| 4,827,435 | 5/1989 | Marron et al. | 364/559 |
| 4,876,527 | 10/1989 | Oka et al. | 340/441 |
| 4,900,226 | 2/1990 | de Vries | 416/34 |
| 4,934,825 | 6/1990 | Martin | 364/431.01 |
| 4,939,659 | 7/1990 | Moran et al. | 364/571.01 X |
| 4,958,289 | 9/1990 | Sum et al. | 364/431.01 |
| 5,019,773 | 5/1991 | Sugiura et al. | 324/166 |
| 5,020,008 | 5/1991 | Chambers et al. | 73/2 X |
| 5,033,305 | 7/1991 | Rozelle et al. | 364/565 X |
| 5,138,564 | 8/1992 | de Jong et al. | 364/571.04 |

*Primary Examiner*—Kevin J. Teska
*Attorney, Agent, or Firm*—Richard H. Kosakowski

[57] ABSTRACT

A method and apparatus for measuring relative deflection of interspaced toothed wheels or their equivalents on a less than once per revolution basis. Deflection measurement errors due to wheel imperfections are measured and stored for each tooth pair and later used to correct deflection measurement on a tooth pair basis. The apparatus includes a sensing circuit which is operative to provide a signal when teeth pass a fixed position, a duty cycle to digital hardware circuit which is operative to measure the duration of the state of the sensing circuit signal, and a computer which is operative to compute, store, and apply correction factors in response to the duration of the state of the signal.

7 Claims, 2 Drawing Sheets

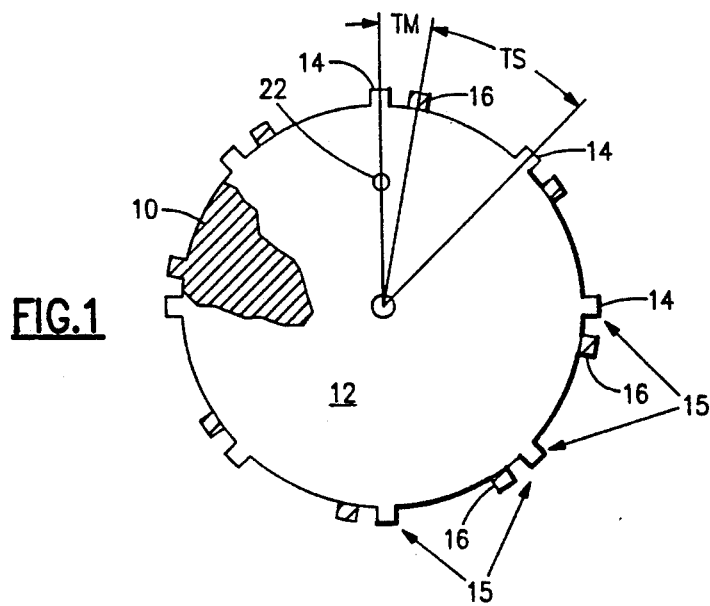
FIG.1
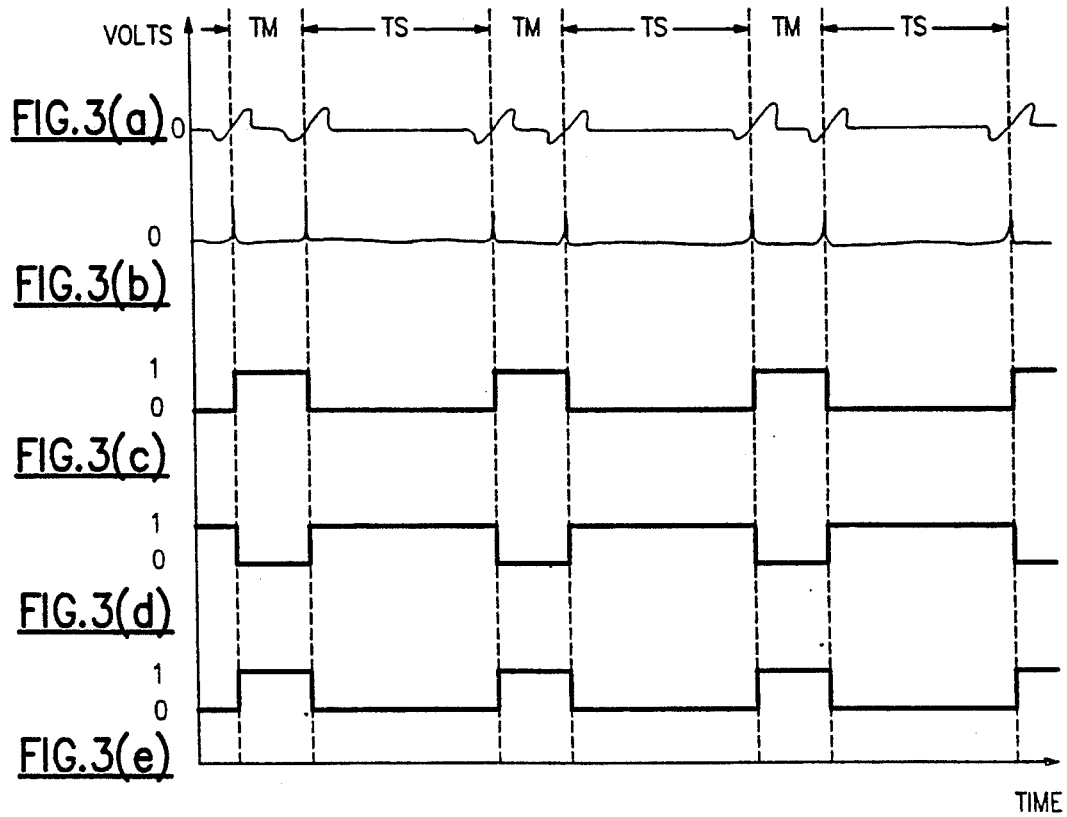

MEASURING RELATIVE DEFLECTION OF INTERSPACED TOOTHED WHEELS ON A LESS THAN ONCE PER REVOLUTION BASIS

TECHNICAL FIELD

This invention relates to measuring relative deflection, and more particularly to measuring propeller blade pitch by measuring relative deflection of interspaced toothed wheels on a less than once per revolution basis.

BACKGROUND ART

Blade pitch measurement is desirable for efficient operation of propeller driven aircraft. An aircraft propeller has a number of pitched blades which rotate around a hub to produce thrust. The amount of thrust produced by the propeller is a function of the rotational speed of the propeller and the pitch of the blades. In order to maintain an efficient rotational speed while changing the amount of thrust, the pitch of the blades must be adjusted. However, the blade pitch must be known to properly adjust the pitch of the blades.

It is known in the prior art to use toothed wheels or their equivalents to measure blade pitch. Typically, two toothed wheels—a reference wheel and a variable wheel—are used. Each wheel has corresponding sets of equally spaced teeth which serve as reference points. The reference wheel turns on a shaft at a known rotational speed and the variable wheel turns on another shaft at substantially the same rotational speed as the reference wheel. The variable wheel is connected to the propeller in such a way that as the blade pitch changes, the variable wheel advances or retreats, i.e., deflects, slightly relative to the reference wheel. Fixed position magnetic pick-ups located proximately to both wheels sense the passing teeth on the wheels. The magnetic pick-ups generate waveshaped pulses when the teeth pass by. Changes in deflection are reflected as changes in the timing between waveshaped pulses. Thus, blade pitch can be calculated from the relative deflection of the teeth of two toothed wheels.

Due to manufacturing constraints, the spacing between teeth on a wheel varies slightly. It is not possible to produce a perfect wheel. It naturally follows that it is not possible to produce two perfect wheels with equally spaced teeth to serve as a variable wheel and reference wheel.

Tooth spacing imperfections present a problem for blade pitch measuring systems. On a per revolution basis, the measurement errors caused by such spacing imperfections will cancel because every wheel has 360 degrees. In other words, even though tooth spacing may vary from tooth to tooth, the sum of all inter-tooth spacing measurements must still add up to 360 degrees. However, measuring on a per revolution basis results in an unsteady transient output. As the blade pitch changes, the measured relative deflection jumps from one reading to the next due to the time lag imposed by waiting for a full revolution. Uncorrected measurements taken on a less than once per revolution basis, i.e., including the error, provide both an unsteady steady-state and an unsteady transient output.

DISCLOSURE OF THE INVENTION

An object of the present invention is to provide a method and apparatus for measuring relative deflection on a less than once per revolution basis.

Another object of the present invention is to provide a method and apparatus for measuring relative deflection which exhibits more steady and accurate transient and steady-state output.

According to the method aspect of the present invention, deflection measurement errors for each reference point on interspaced toothed wheels or their equivalent are measured over an entire revolution at a constant speed and deflection, the errors are used to calculate correction factors for each reference point, and the correction factors are stored and later used to correct relative deflection measurement on a less than once per revolution basis at any rotational speed and phase angle.

In accord with another aspect of the present invention, an apparatus for measuring relative deflection of interspaced toothed wheels on a less than once per revolution basis comprises means for measuring uncorrected relative-deflection of a first rotating means with respect to a second rotating means and means for calculating and applying correction factors to the uncorrected relative deflection measurements provided by the measuring means.

The present invention has utility in the field of avionics. By providing more accurate blade pitch measurement to a flight control system, the present invention facilitates more efficient operation of propeller driven aircraft.

Other objects, features, and advantages will become apparent from the specification and claims and from the accompanying drawing which illustrates an embodiment of the invention.

BRIEF DESCRIPTION OF THE DRAWING

FIG. 1 is a partially broken away view of a set of toothed wheels in accordance with the method and apparatus of the present invention;

FIG. 3 (comprising FIGS. 3A through 3E) is a signal timing diagram showing the state of various nodes of FIG. 2 under operative conditions.

BEST MODE FOR CARRYING OUT THE INVENTION

Figure 2:
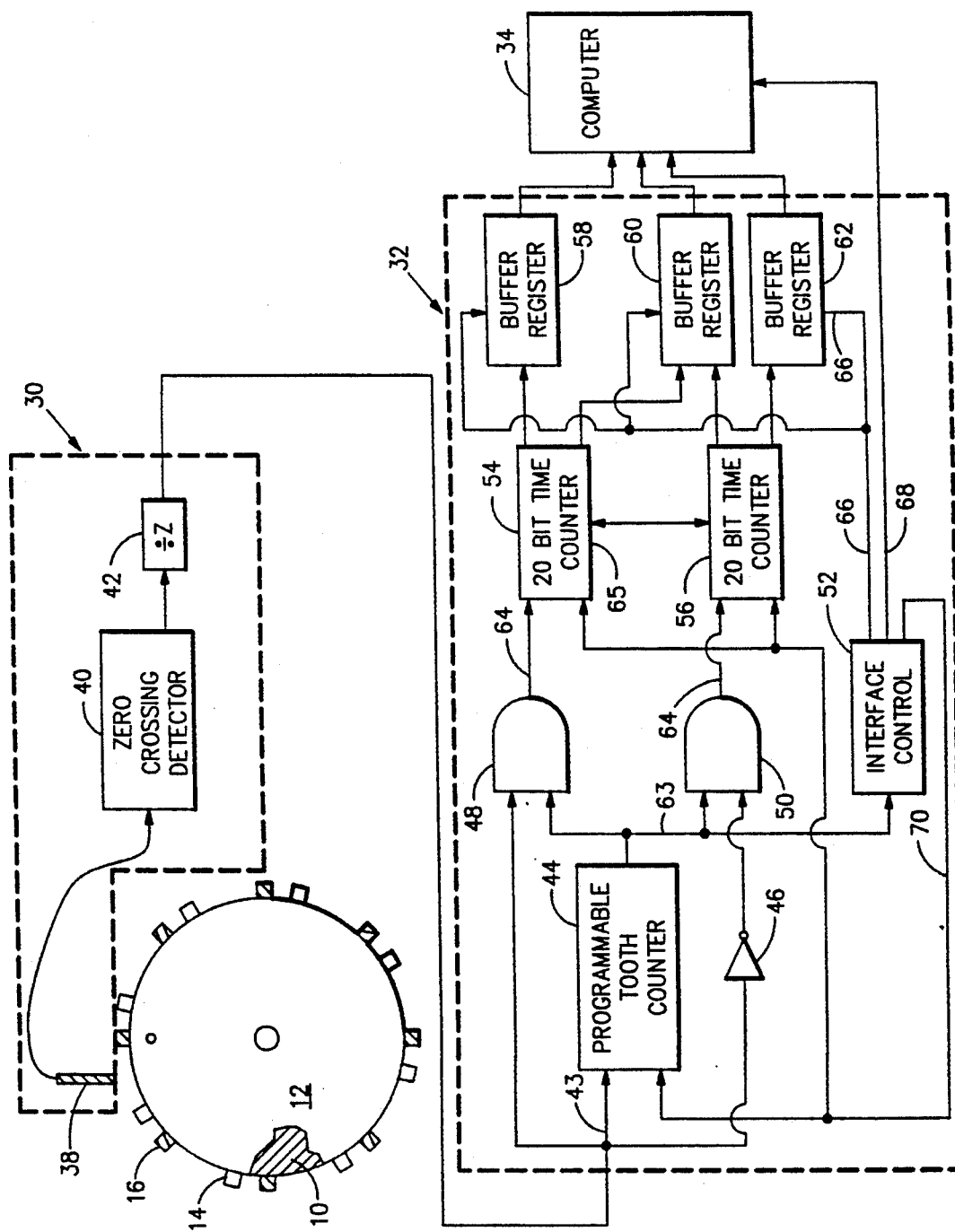
FIG. 2 is a schematic/block diagram of an apparatus which produces corrected relative deflection of the toothed wheels of FIG. 1.

FIG. 1 illustrates the relationship between a variable wheel 10 and a reference wheel 12 in accordance with the present invention. Each adjacent pair of reference teeth 14, known as a tooth pair 15, on the reference wheel 12 has an associated variable tooth 16 on the variable wheel 10 located in between the tooth pair 15. Distances between the variable tooth 16 and its associated reference teeth 14 in the tooth pair 15 are commonly referred to as "the space" ("TS") and "the mark" ("TM"), where TM is the shorter of the two distances. The toothed wheels 10, 12 are disposed in such a way that TM is never greater than TS.

Each wheel 10, 12 has a synchro index mark 22. The index marks 22 serve to identify a particular tooth pair 15 as a starting point so that every other tooth pair 15 can be identified with respect to the starting point. The implementation of such a synchro mark 22 is well known in the art.

On a per revolution basis, propeller blade pitch can be calculated as:

$$\text{Pitch (ideal)} = C \frac{TS - TM}{TS + TM} \quad [\text{Eq. 1}]$$

where C is a constant whose value is determined by means well known in the art. Eq. 1 represents ideal deflection of the variable wheel 10 with respect to the reference wheel 12 because the equation does not account for tooth spacing imperfections. For measurement on a less than once per revolution basis, it is necessary to account for such imperfections.

For a set of wheels 10, 12 having eight teeth 14, 16 each, such as those illustrated in FIG. 1, the expected value of TS+TM ("$(TS+TM)_{Exp}$") for each tooth pair 15 is forty five degrees, i.e., 360/8=45. If an actual measurement of TS+TM ("$(TS+TM)_{Act}$") is taken and stored for a tooth pair 15, a run time measurement of TS+TM ("$(TS+TM)_{RT}$") for that tooth pair 15 can be corrected to 45 degrees with a denominator correction factor ("dencor") which represents the error in the denominator of Eq. 1. Thus, $$\text{dencor} = \frac{(TS + TM)_{Exp}}{(TS + TM)_{Act}} \quad [\text{Eq. 2}]$$

and, $$(TS + TM)_{RT} \times \frac{(TS + TM)_{Exp}}{(TS + TM)_{Act}} \approx 45° \quad [\text{Eq. 3}]$$

The error in the numerator of the ideal equation, Eq. 1, for run time measurement, i.e., $(TS-TM)_{RT}$, is $(TS_{Exp}-TS_{Act})-(TM_{Exp}-TM_{Act})$. Expressed in terms of its effect on relative deflection, the error provides a duty cycle correction factor ("dutcor"):

$$\text{dutcor} = \frac{(TS_{Exp} - TS_{Act}) - (TM_{Exp} - TM_{Act})}{(TS + TM)_{Exp}} \quad [\text{Eq. 4}]$$

Thus, a corrected relative deflection ("CRD") for any tooth pair 15 is:

$$CRD = \frac{(TS - TM)_{RT}}{(TS + TM)_{RT} \times \frac{(TS + TM)_{Exp}}{(TS + TM)_{Act}}} + \frac{(TS_{Exp} - TS_{Act}) - (TM_{Exp} - TM_{Act})}{(TS + TM)_{Exp}} \quad [\text{Eq. 5}]$$

The CRD of any tooth pair 15 also represents the corrected relative deflection of the wheels 10, 12. Therefore, actual propeller blade pitch can be measured on a less than once per revolution basis as:

$$\text{pitch (actual)} = C \times CRD \quad [\text{Eq. 6}]$$

FIG. 2 is a schematic/block diagram of an apparatus which provides CRD and actual blade pitch measurement for the wheels 10, 12 of FIG. 1 by implementing Eq. 6. The apparatus includes a sensing circuit 30, a duty cycle to digital converter hardware ("HW") circuit 32 and a computer 34. The sensing circuit 30 includes a magnetic pick-up 38, a zero crossing detector 40, and a toggle type flip flop 42. 10 The sensing circuit 30 is operative to provide a digital signal (FIG. 3 (c)) on a line 43 indicative of teeth 14, 16 passing a fixed point (not illustrated) on either wheel 10, 12. The magnetic pick-up 38 senses the passing of teeth 14, 16 and provides a waveshaped pulse signal (FIG. 3 (a)) for each passing tooth 14, 16. The waveshaped pulse signals (FIG. 3 (a)) provided by the pick-up 38 are fed to the zero crossing detector 40. Thus, the zero crossing detector 40 receives a waveshaped pulse as teeth 14, 16 pass the fixed position on either wheel 10, 12. The zero crossing detector 40 is operative in response to the waveshaped pulse signals (FIG. 3 (a)) to provide a voltage spike signal (FIG. 3 (b)) for each passing tooth 14, 16. The voltage spike signal (FIG. 3 (b)) of the zero crossing detector 40 is fed to the toggle type flip flop 42. The flip flop 42 is operative in response to the voltage spike signal (FIG. 3 (b)) to provide the digital signal (FIG. 3 (c)). The flip flop 42 toggles between HI and LO output on each voltage spike. Thus, the sensing circuit 30 provides a distinct digital signal (FIG. 3 (c)), i.e., HI and LO, corresponding to the duration of TS and TM, but not necessarily respectively.

The HW circuit 32 is operative in response to the digital signal (FIG. 3 (c)) coming from the sensing circuit 30 to provide uncorrected measurements of the duration of TS and TM which can be read by the computer 34. The HW circuit 32 includes a programmable tooth counter 44, an inverter 46, a first AND gate 48, a second AND gate 50, an interface control 52, a first time counter 54, a second time counter 56, a first buffer register 58, a second buffer register 60, and a third buffer register 62.

The programmable tooth counter 44 is operative in response to the digital signal (FIG. 3 (c)) coming from the sensing circuit 30 to provide an output command after counting a desired number of teeth 14, 16. The desired number can be changed electronically by means well known in the art. The output command of the tooth counter 44 is fed to the AND gates 48, 50 and the interface control 52 on a line 63.

The AND gates 48, 50 are operative in response to the digital signal (FIG. 3 (c)) coming from the sensing circuit 30 and the output command of the programmable tooth counter 44 to provide a digital logic HI on different enable lines 64 corresponding to the duration of either TS or TM. For example, if the digital signal (FIG. 3 (c)) coming from the sensing circuit 30 is HI for TM and LO for TS, the first AND gate 48 will provide a corresponding signal (FIG. 3 (e)) which is HI for the duration of TM and LO for the duration of TS. Further, the second AND gate 50, having an input which is inverted by the inverter 46, will provide a signal (FIG. 3 (d)) which is HI for the duration of TS and LO for the duration of TM.

The 20 bit time counters 54, 56 are operative in response to the signals (FIG. 3 (d, e)) coming from the AND gates 48, 50 to provide a count representation signal (not illustrated) of TS and TM. The count representation signal contains a number of cycles which occur over the duration of TS and TM at a known clock speed 65 while the counters 54, 56 are enabled. The outputs of the AND gates 48, 50 are connected to respective enable lines 64 of the time counters 54, 56. Therefore, the counters 54, 56 operate to count at a known clock speed 65 while enabled by the AND gates 48, 50 so as to provide separate count representations of the duration of TS and TM. For the example situation described hereinbefore, the first time counter 54 would be enabled by the first AND gate 48 for the duration of TM and the second time counter 56 would be enabled by the second AND gate 50 for the duration of TS.

The buffer registers 58, 60, 62 are operative in response to the count representation signals coming from the 20 bit time counters 54, 56 and a write command 66 to temporarily store and then feed the count representation signals to the computer 34. Either the first buffer register 58 or third buffer register 62 may contain the sum of all TM measurements or the sum of all TS measurements depending on when the tooth counter 44 is started. For the example situation described hereinbefore, the first buffer register 58 would contain the measurement for TM and the third buffer register 62 would contain the measurement for TS. The second buffer register 60 contains the least significant counts of the first time counter 54 and the second time counters 56.

The interface control 52 is operative in response to the signal from the tooth counter 44 to provide the write command 66 to the buffer registers 58, 60, 62, an end of conversion ("EOC") command 68 and a reset command 70. When the programmed number of teeth 14, 16 have passed the wheels 10, 12, the tooth counter 44 sends the output command to the interface control 52. In response, the interface control 52 sends the reset command 70 to the programmable tooth counter 44 and the time counters 54, 56, a write command 66 to the buffer registers 58, 60, 62, and the EOC command 68 to the computer 34. The reset command 70 resets the programmable tooth counter 44 and the time counters 54, 56 so as to begin another measurement. The write command 66 causes the values in the time counters 54, 56 to be written into the buffer registers 58, 60, 62. The EOC command 68 indicates to the computer 34 that a measurement has been taken and is waiting in the buffers 58, 60, 62.

The computer 34 is operative in response to the count representation signal in the buffer registers 58, 60, 62 to calculate CRD. Since the time counters 54, 56 count at the known clock speed 65, such as 12 MHz, the time value of TS or TM is calculated as:

$$TS \text{ or } TM \text{ (sec)} = \frac{\text{No. of counts}}{12 \text{ MHz}}. \quad [\text{Eq. 7}]$$

Further, since the rotational speed of the wheels 10, 12 is known, the duration values of TS and TM can easily be converted to distance values. The computer 34 determines which measurement is TS and which is TM by comparing the two measurements. The greater of the two measurements is TS. Once distance representations for TS and TM are computed, the computer 34 calculates CRD utilizing stored values of dencot and dutcor, i.e., the computer 34 computes Eq. 6.

To calculate the correction factors, dencor and dutcor, uncorrected values for TS and TM are measured and stored for every tooth pair 15 over an entire revolution. Speed and relative deflection between the wheels 10, 12 must remain constant while the measurements are made. Assuming a set of wheels 10, 12 with eight teeth 14, 16, expected values are calculated as follows:

$$TS_{Exp} = \quad [\text{Eq. 8}]$$
$$\frac{(TS_1 + TS_2 + TS_3 + TS_4 + TS_5 + TS_6 + TS_7 + TS_8)_{Act}}{8};$$

$$TM_{Exp} = \quad [\text{Eq. 9}]$$
$$\frac{(TM_1 + TM_2 + TM_3 + TM_4 + TM_5 + TM_6 + TM_7 + TM_8)_{Act}}{8}.$$

Next, denominator and duty cycle correction factors are calculated for each tooth pair 15:

$$dencor_1 = \frac{(TS + TM)_{Exp}}{(TS_1 + TM_1)_{Act}}; \quad [\text{Eq. 10}]$$

$$dencor_2 = \frac{(TS + TM)_{Exp}}{(TS_2 + TM_2)_{Act}}; \quad [\text{Eq. 11}]$$

$$dencor_3 = \frac{(TS + TM)_{Exp}}{(TS_3 + TM_3)_{Act}}; \quad [\text{Eq. 12}]$$

$$dencor_4 = \frac{(TS + TM)_{Exp}}{(TS_4 + TM_4)_{Act}}; \quad [\text{Eq. 13}]$$

$$dencor_5 = \frac{(TS + TM)_{Exp}}{(TS_5 + TM_5)_{Act}}; \quad [\text{Eq. 14}]$$

$$dencor_6 = \frac{(TS + TM)_{Exp}}{(TS_6 + TM_6)_{Act}}; \quad [\text{Eq. 15}]$$

$$dencor_7 = \frac{(TS + TM)_{Exp}}{(TS_7 + TM_7)_{Act}}; \quad [\text{Eq. 16}]$$

$$dencor_8 = \frac{(TS + TM)_{Exp}}{(TS_8 + TM_8)_{Act}}; \quad [\text{Eq. 17}]$$

$$dutcor_1 = \frac{(TS_{Exp} - TS_{1Act}) - (TM_{Exp} - TM_{1Act})}{(TS + TM)_{Exp}}; \quad [\text{Eq. 18}]$$

$$dutcor_2 = \frac{(TS_{Exp} - TS_{2Act}) - (TM_{Exp} - TM_{2Act})}{(TS + TM)_{Exp}}; \quad [\text{Eq. 19}]$$

$$dutcor_3 = \frac{(TS_{Exp} - TS_{3Act}) - (TM_{Exp} - TM_{3Act})}{(TS + TM)_{Exp}}; \quad [\text{Eq. 20}]$$

$$dutcor_4 = \frac{(TS_{Exp} - TS_{4Act}) - (TM_{Exp} - TM_{4Act})}{(TS + TM)_{Exp}}; \quad [\text{Eq. 21}]$$

$$dutcor_5 = \frac{(TS_{Exp} - TS_{5Act}) - (TM_{Exp} - TM_{5Act})}{(TS + TM)_{Exp}}; \quad [\text{Eq. 22}]$$

$$dutcor_6 = \frac{(TS_{Exp} - TS_{6Act}) - (TM_{Exp} - TM_{6Act})}{(TS + TM)_{Exp}}; \quad [\text{Eq. 23}]$$

$$dutcor_7 = \frac{(TS_{Exp} - TS_{7Act}) - (TM_{Exp} - TM_{7Act})}{(TS + TM)_{Exp}}; \quad [\text{Eq. 24}]$$

$$dutcor_8 = \frac{(TS_{Exp} - TS_{8Act}) - (TM_{Exp} - TM_{8Act})}{(TS + TM)_{Exp}}. \quad [\text{Eq. 25}]$$

Once the correction factors are calculated, they are stored in non-volatile memory and used repeatedly for as long as some means of tooth pair 15 identification (to indicate a starting point for measuring) is possible. The synchro index mark 22 can provide such tooth pair 15 identification. If no means of tooth pair 15 identification is used, the correction factors may be recalculated for each flight.

The invention has been described for use with a single magnetic pick-up. However, it is to be understood that two pick-ups may be used—one for sensing the teeth of the reference wheel, and a second for sensing the teeth of the variable wheel in a manner which should be apparent to one of ordinary skill in the art.

All of the foregoing changes are irrelevant to the broadest scope of the present invention; it suffice that uncorrected relative deflection of reference points on a first rotating means with respect to reference points of a second rotating means is measured, and predetermined correction factors are applied to the uncorrected relative deflection measurement of one or more reference points so as to provide corrected relative deflection measurement.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

What is claimed is:

1. Apparatus, comprising:
   a. a first rotatable member having a predetermined number of teeth disposed thereon;
   b. a second rotatable member having a predetermined number of teeth disposed thereon, a position of the teeth of the first rotatable member being instantaneously varying relative to a position of the teeth of the second rotatable member;
   c. sensing means for sensing an actual position of the teeth of the first rotatable member relative to an actual position of the teeth of the second rotatable member, and for providing one or more actual positional signals indicative thereof; and
   d. signal processing means, responsive to the one or more actual positional signals, for determining an expected position of the teeth of the first rotatable member relative to an expected position of the teeth of the second rotatable member and for providing one or more expected positional signals indicative thereof, and for determining any difference between the one or more actual positional signals and the corresponding one or more expected positional signals and for calculating correction value signals indicative thereof.

2. The apparatus of claim 1, wherein the sensing means comprises an electromagnetic sensor that senses the proximate presence or absence of the teeth of the first and second rotatable members to the sensor, the sensor operable to provide the one or more actual positional signals.

3. The apparatus of claim 1, wherein the first and second rotatable members are rotatable at equal speeds.

4. The apparatus of claim 1, wherein the first and second rotatable members are both rotated at an equal and constant speed over at least one complete reference revolution of both the first and second rotatable members, and the position of the teeth of the first rotatable member is held constant with respect to the position of the teeth of the second rotatable member during the at least one complete reference revolution of both the first and second rotatable members.

5. The apparatus of claim 4, wherein the sensing means comprises means, operable during the at least one complete reference of both the first and second rotatable members, for sensing the actual position of the teeth of the first rotatable member relative to the actual position of the teeth of the second rotatable member and for providing the one or more actual positional signals indicative thereof; and wherein the signal processing means comprises means, operable during the at least one complete reference revolution of both the first and second rotatable members and responsive to the one or more actual positional signals, for determining the expected position of teeth of the first rotatable member relative to the expected position of the teeth of the second rotatable member and for providing the one or more expected positional signals indicative thereof, and for determining any difference between the one or more actual positional signals and the corresponding one or more expected positional signals and for calculating the correction value signals indicative thereof.

6. The apparatus of claim 5, wherein the first and second rotatable members are both rotated at equal speeds over revolutions of both members subsequent to the at least one complete reference revolution, the position of the teeth of the first rotatable member being instantaneously varying relative to a position of the teeth of the second rotatable member over revolutions of both members subsequent to the at least one complete reference revolution; and wherein the sensing means comprises means, operable over revolutions of both rotatable members subsequent to the at least one complete reference revolution, for sensing the actual position of the teeth of the first rotatable member relative to the actual position of the teeth of the second rotatable member and for providing the one or more actual positional signals indicative thereof; and wherein the signal processing means comprises means, responsive to the one or more actual positional signals and operable over revolutions of both rotatable members subsequent to the at least one complete reference revolution, for applying the corresponding calculated correction value signals to the one or more actual positional signals to determine a corrected relative position between the teeth of the first rotatable member with respect to the teeth of the second rotatable member.

7. Apparatus for measuring any angular difference in the position of first and second rotatable members with respect to each other at one or more angular intervals that are less than one complete revolution of the rotatable members, the apparatus being operable to correct for any inherent differences in each of the one or more angular intervals on one or both of the rotatable members, comprising:
   a. sensing means for sensing an actual angular position of one or more teeth of the first rotatable member relative to an actual angular position of corresponding one or more teeth of the second rotatable member, and for providing one or more actual positional signals indicative thereof, the positioning of the one or more teeth on each of the rotatable members being indicative of the one or more angular intervals on each of the rotatable members; and
   b. signal processing means, responsive to the one or more actual positional signals for determining therefrom an expected angular position of the one or more teeth of the first rotatable member relative to an expected angular position of the one or more teeth of the second rotatable member and for providing one or more expected positional signals indicative thereof, and for determining any difference between the one or more actual positional signals and the corresponding one or more expected positional signals and for providing one or more corresponding difference signals indicative thereof; and
   c. wherein the signal processing means further comprises means for calculating one or more correction value signals based on values of the corresponding one or more difference signals, and for utilizing the one or more correction value signals to determine corrected angular signals indicative of any difference between the angular positioning of the one or more teeth of the first rotatable member relative to the angular positioning of the corresponding one or more teeth of the second rotatable member.

* * * * *